United States Patent
Van Pelt et al.

(10) Patent No.: US 7,500,696 B2
(45) Date of Patent: Mar. 10, 2009

(54) FLARED THRU ASSEMBLY

(75) Inventors: Stephen G. Van Pelt, Cranford, NJ (US); Ella Stamler, Hillsborough, NJ (US); Zachary S. Pannone, Madison, NJ (US)

(73) Assignee: Saint-Gobain Performance Plastics Corporation, Wayne, NJ (US)

( * ) Notice: Subject to any disclaimer, the term of this patent is extended or adjusted under 35 U.S.C. 154(b) by 217 days.

(21) Appl. No.: 11/040,817

(22) Filed: Jan. 21, 2005

(65) Prior Publication Data

US 2006/0163871 A1 Jul. 27, 2006

(51) Int. Cl.
*F16L 33/00* (2006.01)

(52) U.S. Cl. ............. 285/256; 285/55; 285/222.1; 138/109

(58) Field of Classification Search ... 285/222.1–222.5, 285/256, 55; 138/109, 137, 141
See application file for complete search history.

(56) References Cited

U.S. PATENT DOCUMENTS

| | | | | |
|---|---|---|---|---|
| 1,808,094 A | * | 6/1931 | Yackey | 285/55 |
| 2,019,540 A | * | 11/1935 | Mascuch | 285/55 |
| 2,184,116 A | * | 12/1939 | Eastman | 285/256 |
| 2,299,171 A | * | 10/1942 | Muller | 285/222.3 |
| 3,467,764 A | * | 9/1969 | Knapp | 174/74 R |
| 5,393,104 A | * | 2/1995 | Zornow | 285/40 |
| 6,290,267 B1 | * | 9/2001 | Swingley | 285/312 |
| 6,494,503 B1 | | 12/2002 | Heubach et al. | |

FOREIGN PATENT DOCUMENTS

EP 0 707 170 A1 4/1996

OTHER PUBLICATIONS

Page International, Silicone Hose Products Catalog, Fort Worth, Texas, pp. 1-8 (Copyright 2003).

* cited by examiner

*Primary Examiner*—Aaron M Dunwoody
*Assistant Examiner*—Fannie Kee
(74) *Attorney, Agent, or Firm*—Larson Newman Abel & Polansky LLP; Chi Suk Kim

(57) ABSTRACT

A fluid conduit includes a hose and a fitting. The hose has a terminal end having a first portion along which an outer layer is laminated to an inner layer and a second portion along which the inner layer extends from the outer layer. The fitting includes a receiving portion and a coupling portion. The receiving portion has a first inner surface defining a first lumen portion, and is configured to receive the first portion of the terminal end, and for crimping to the hose. The coupling portion has a second inner surface defining a second lumen portion for receiving the second portion of the terminal end. The first lumen portion and the second lumen portion are in fluid communication with each other.

22 Claims, 4 Drawing Sheets

FLARED THRU ASSEMBLY

TECHNICAL FIELD OF THE DISCLOSURE

This disclosure, in general, relates to hose fittings, hoses, and methods for manufacturing same.

BACKGROUND

In industries such as food, pharmaceutical, and chemical production, contamination is of great concern. Contamination can take the form of bacteria growth or material from the fittings themselves can be affected by the materials used. In general, contamination may degrade the quality of the product. In either case, food stocks, pharmaceutical agents, or chemicals contaminated are unusable and generally discarded.

Typical processes in food manufacturing, pharmaceutical, and chemical industries utilize fluid transport of food materials, pharmaceutical agents, and chemicals. Specialty pumps and hoses are frequently used. Typical specialty pumps and hoses have stainless steel fittings that limit the types of materials that fluids contact. However, typical hoses and fittings used in the fluid transport may interact with the materials they contact. Another method for assembling fittings is to utilize a system that insures that only the liner material of the hose comes into contact with the material being moved.

In this second case typical fittings include two or more pieces. The first piece is inserted between the liner and outer layers of the hose, delaminating the liner from the outer layers of the hose in the coupling region. A collar is placed over the first piece and outer surface of the hose in the region of the delamination and crimped to the outer layer of the hose, pinching the outer layers of the hose between the collar and the delaminating first piece. In other typical fittings, the end of the hose is deconstructed and reconstructed about an inner fitting or coupling portion. An outer collar is crimped to the outer surface of the hose, pinching the outer layers of the hose and reconstructed portions of the hose to the inner fitting. As such, many fittings utilize more than one piece and include a region of delaminated outer layers and liners in the crimping regions. Such typical fittings are expensive. Moreover, these hoses and fittings may exhibit poor performance at process conditions, such as high temperatures and vacuum. As such, an improved hose and fitting system would be desirable.

SUMMARY

In a particular embodiment, the disclosure is directed to a fluid conduit including a hose and a fitting. The hose has a terminal end having a first portion along which an outer layer is laminated to an inner layer and a second portion along which the inner layer extends from the outer layer. The fitting includes a receiving portion and a coupling portion. The receiving portion has a first inner surface defining a first lumen portion, and is configured to receive the first portion of the terminal end, and for crimping to the hose. The coupling portion has a second inner surface defining a second lumen portion for receiving the second portion of the terminal end. The first lumen portion and the second lumen portion are in fluid communication with each other.

In a further embodiment, the disclosure is directed to a fluid conduit including a hose and a fitting. The hose has a terminal end having a first portion having an outer layer and an inner layer, and a second portion along which the inner layer extends from the outer layer. The fitting includes a receiving portion and a coupling portion. The receiving portion has a first inner surface defining a first lumen portion and configured to receive the first portion of the terminal end of the hose. The receiving portion is configured for crimping to the outer layer of the first portion of the terminal end. The coupling portion has a second inner surface defining a second lumen portion. The inner layer of the second portion of the terminal end extends into the second lumen portion, and is adhesively coupled to the second inner surface. The first lumen portion and the second lumen portion are in fluid communication with each other.

In another embodiment, the disclosure is directed to a fluid conduit including a hose and a one-piece fitting. The hose has a terminal end including an inner layer and an outer layer. The one-piece fitting comprises a coupling portion and a receiving portion opposite the coupling portion. The receiving portion is configured to receive the terminal end of the hose, and is configured for crimping to the hose.

In an embodiment, the disclosure is also directed to a method for forming a fluid conduit including inserting a hose into a receiving portion of a one-piece fitting and crimping the receiving portion to the hose. The hose has a terminal end having a first portion having an inner layer and an outer layer, and a second portion along which the inner layer extends beyond the outer layer. The fitting has a receiving portion and a coupling portion. The receiving portion has a first inner surface defining a first lumen portion, and the coupling portion has a coupling surface and a second inner surface defining a second lumen portion. The first lumen portion and the second lumen portion are in fluid communication with each other.

In a further embodiment, the disclosure is directed to a hose fitting for coupling to a hose having a terminal end having a first portion along which an outer layer is laminated to an inner layer and a second portion along which the inner layer extends from the outer layer. The hose fitting includes a receiving portion and a coupling portion. The receiving portion has a first inner surface defining a first lumen portion. The receiving portion is configured to receive the first portion of the terminal end, and for crimping to the hose. The coupling portion has a second inner surface defining a second lumen portion for receiving the second portion of the terminal end. The first lumen portion and the second lumen portion are in fluid communication with each other.

DESCRIPTION OF THE PREFERRED EMBODIMENT(S)

In a particular embodiment, a fluid conduit is provided that includes a hose and at least one fitting. The hose may have one or more outer layers and an inner layer, such as an inner liner. In a particular construction of the hose, the hose has a terminal end having a first portion along which the inner layer and the outer layers are laminated and having a second portion along which the inner layer extends beyond the outer layer.

The fitting generally has a coupling portion and a receiving portion. In one exemplary embodiment, the coupling portion has a reduced diameter region having an inner surface that defines a coupling lumen portion. The receiving portion is configured to receive the hose and has an inner surface defining a receiving lumen portion. The inner surface of the receiving portion may include engagement structures, such as radially inwardly extending protrusions, which may engage an outer layer or layers of the hose when the receiving portion is crimped to the hose. The inner layer or liner of the hose may extend beyond the outer layers and into the coupling portion lumen and be adhesively coupled to the inner surface of the coupling portion. In an exemplary embodiment, the inner layer liner may be formed to follow the contour of the inner surface of the coupling portion. For example, the inner layer liner may be thermoformed where a portion of the inner layer liner of the second portion of the terminal end of the hose may be flared near a coupling surface of the coupling portion.

Figure 1:
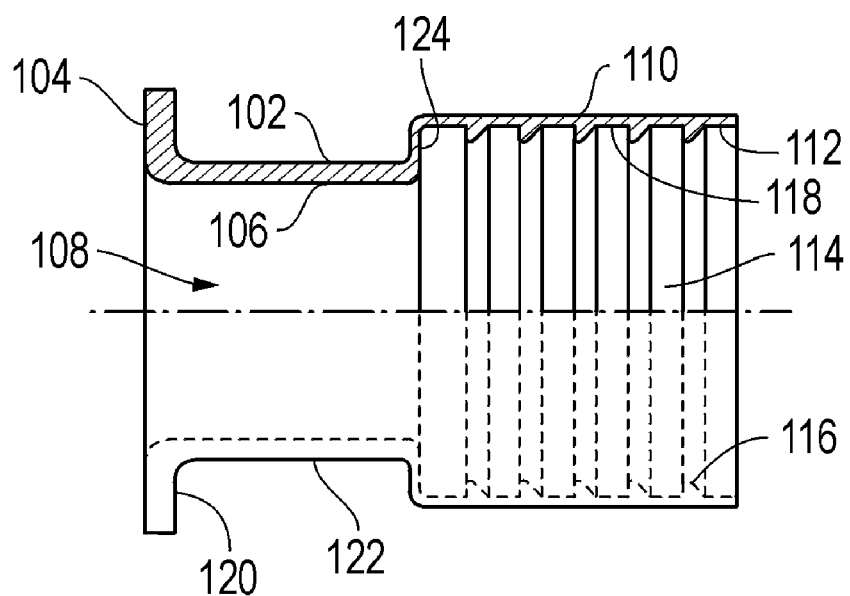
FIG. 1 depicts an exemplary embodiment of a flare thru fitting.

FIG. 1 depicts an exemplary embodiment of a fitting. The fitting includes a receiving portion 110 and a coupling portion 102. The receiving portion 110 and the coupling portion 102 join at a shoulder 124, an inner surface of the shoulder 124 being generally perpendicular to a longitudinal axis of the fitting. The receiving portion 110 is configured to receive a hose and includes an inner surface 112 defining a first lumen portion 114 for receiving the hose. The inner surface 112 may include engagement structures, such as radially inwardly projecting protrusions 116 and recessed portions 118. In the exemplary embodiment depicted in FIG. 1, the inwardly projecting protrusions 116 are depicted as annular ridges with recesses 118 therebetween. In other exemplary embodiments, the inwardly projecting protrusions 116 may include threading, ridges, teeth, or a plurality of inwardly extending protrusions surrounded by a continuous recessed surface.

The coupling portion 102 includes a coupling surface 104 and an inner surface 106 defining a second lumen portion 108. The first lumen portion 114 is in fluid communication with the second lumen portion 108. The coupling end 102 may generally be defined by a flared portion 120 connected to a reduced diameter portion 122. This configuration may form a portion of a coupling or connection, such as an I-Line® connection, Tri-Clamp® connection, cam-lock coupling, or flange assembly.

In one particular embodiment, the hose includes one or more outer layers surrounding an inner liner layer. The outer layers may include reinforcement layers and surface protecting layers. For example, the hose may be constructed of a rubber layer surrounded by a fabric. Wires may be wrapped around some layers, forming a further outer layer and providing structural integrity. In further exemplary embodiments, the outer surface may be coated with a polyester or nylon fabric. The inner layer or liner may be formed of fluoropolymers, such as FEP or PTFE. In one exemplary embodiment, the hose construction includes an internal smooth liner bonded to a rubber hose construction. Reinforcement layers, such as helix wire support layer, may be included about the rubber layer. In addition, the hose may include a chemical and abrasion resistant cover. In this exemplary embodiment, the outer layers include the rubber hose construction, the fabric and wire reinforcement layers, and the EPDM cover. The inner tube consists of a fluoropolymer tube integrally bonded to the outer reinforcement layers.

In exemplary embodiments, a terminal end of the hose has a first portion along which the inner layer and the outer layer are laminated and has a second portion along which the inner layer extends from the outer layer. The terminal end of the hose may be formed, for example, by deconstructing the outer layers, leaving a portion of the inner layer extending beyond the termination of the outer layers. In another exemplary embodiment, the hose may be constructed such that the outer layers terminate leaving a portion of the inner layer extending beyond their termination. In general, the inner layer extends beyond the outer layers at the second portion of the terminal end of the hose.

The terminal end of the hose may be inserted into the receiving portion 110 such that the inner layer extends into the coupling portion 102. The terminal end of the hose may contact shoulder 124 and inner surface 112. The receiving portion 110 may be crimped to the hose such that engagement structures engage the outer layers of the hose. In one particular embodiment, the inner layer is adhesively coupled to the inner surface 106 of the coupling portion 102. In another particular embodiment, the inner layer is formed to the coupling surface 104, such as through thermoforming, to follow the contour of the inner surface 106 of the coupling portion 102. In a further exemplary embodiment, the inner layer of the second portion of the terminal end is flared near the coupling surface 104 of the coupling portion 102. As such, when a coupling or connection is made, fluid traversing through the hose, remains in contact with the inner layer or liner and, in general, does not contact portions of the fitting.

Figure 2:
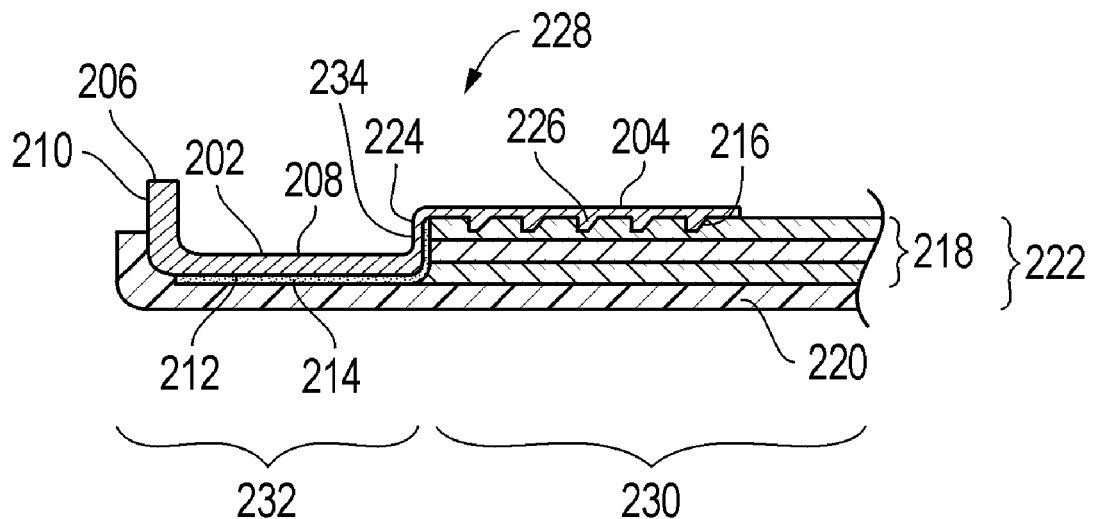
FIG. 2 depicts an exemplary embodiment of a hose with fitting.

FIG. 2 depicts a cross-sectional portion of an exemplary fluid conduit 228. The fluid conduit includes a hose 222 and a fitting 224. The fitting 224 includes a receiving portion 204 and a coupling portion 202, the receiving portion 204 including an inner surface 216 that further defines a first lumen portion configured to receive the hose 222. The inner surface 216 of the receiving portion 204 may further include engagement structures, such as radially inwardly projecting portions 226. The coupling portion 202 includes a flared portion 206 and a reduced diameter portion 208. The flared portion 206 forms a coupling surface 210 and the reduced diameter portion 208 includes an inner surface 212 defining a second lumen portion. The coupling portion 202 is joined to the receiving portion 204 by a shoulder portion 234. An inner surface of the shoulder portion 234 may be generally perpendicular to a longitudinal axis of the fitting.

The hose 222 may include one or more outer layers 218 and an inner layer 220, such as a hose liner. At a first portion 230 of the terminal end of the hose 222, the inner layer 220 and an outer layer 218 may be laminated. At a second portion 232 of the terminal end of the hose 222, the inner layer 220 may extend beyond the termination of the outer layers 218. In this exemplary embodiment, the hose 222 is inserted into receiving portion 204 such that the inner layer 220 extends into the coupling portion 202 and the outer layers 218 terminate about the shoulder 224. In the first portion 230 of the terminal end of the hose 222 within the receiving portion 204, the outer layers 218 and the liner 220 remain laminated. The receiving portion 204 may be crimped to the outer layers 218 of hose 222, engaging, for example, radially inwardly extending protrusions 226 with one or more of the outer layers 218. The inner layer 220 may be adhesively coupled to the inner surface 212 of the coupling portion 220. In one exemplary embodiment, an adhesive layer 214, such as an epoxy layer, may be used to couple the inner layer 220 to the inner surface 212. In a further exemplary embodiment, a portion of the inner layer 220 is formed to the coupling surface 210 or flared in the region of the coupling surface 210, such as through thermoforming.

Figure 3:
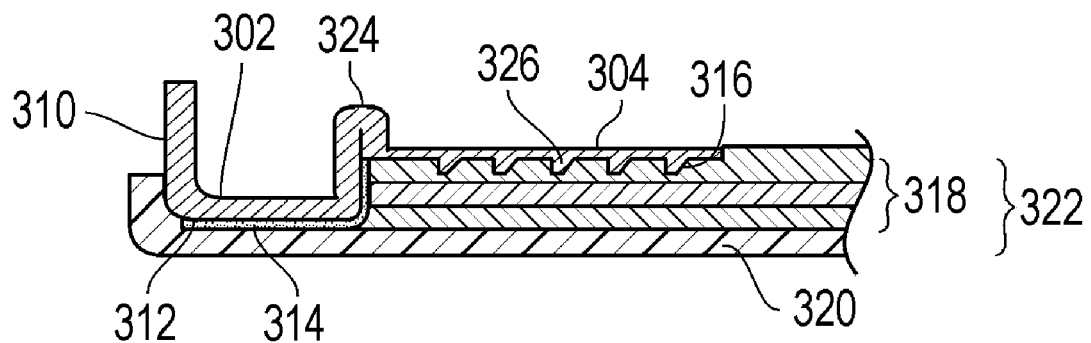
FIG. 3 depicts a further exemplary embodiment of a hose and fitting.

FIG. 3 depicts a cross-sectional portion of a crimped hose 322 and fitting 324. Generally, pressure is applied to the outer surface of the receiving portion 304, driving the inner surface 316 and, for example, radially inwardly extending protrusions 326 into the outer layers 318 of the hose 322. In general, the outer layers 318 of the hose 322 are securely engaged and fastened to the receiving portion 304. The inner layer 320 extends into the coupling portion 302 and may be adhesively coupled (314) to the inner surface 312 of coupling portion 302. The inner layer 320 may be further thermoformed to coupling surface 310 or flared about the opening of the coupling portion 302.

Figure 4A:
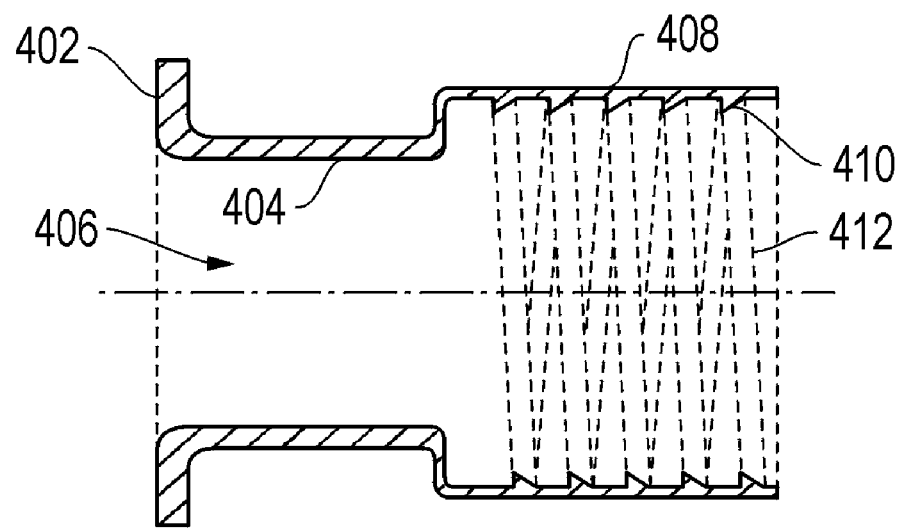
FIGS. 4A, 4B and 4C depict exemplary embodiments of fittings.
Figure 4B:
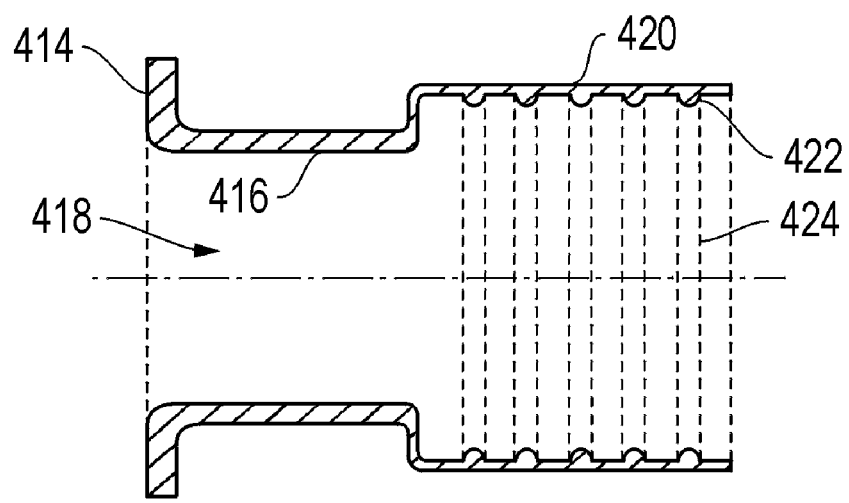
Figure 4C:
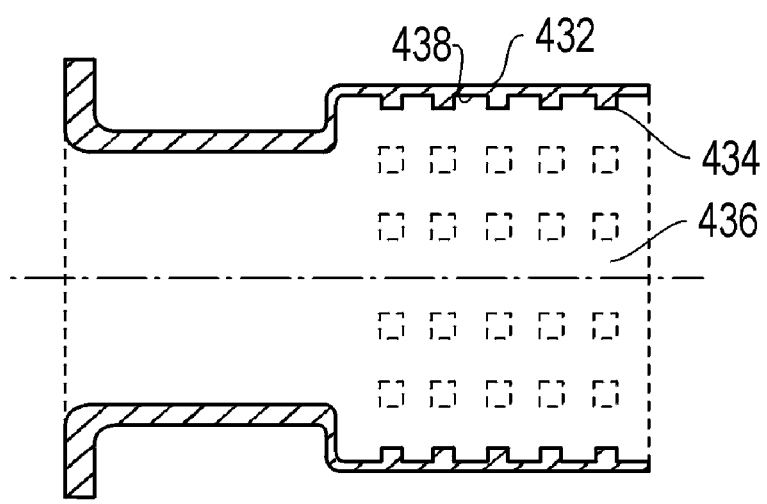

FIGS. 4A-4C depict exemplary methods of engaging the outer surface of a hose within the receiving portion utilizing engagement structures, such as radially inwardly extending protrusions. FIG. 4A depicts an exemplary fitting having a coupling portion 402 and a receiving portion 408. The coupling portion 402 includes an inner surface 404 defining a first lumen portion 406. The receiving portion 408 is configured to receive a hose and includes an inner surface having radially inwardly extending protrusions 410 and defining a second lumen portion 412. In this exemplary embodiment the radially inwardly extending protrusions 410 are depicted as threading.

FIG. 4B depicts an alternate embodiment. A coupling portion 414 includes an inner surface 416 defining a first lumen portion 418. The receiving portion 420 includes generally annular ridges 422 defining a second lumen portion 424 for receiving a hose.

In a further exemplary embodiment, FIG. 4C depicts a plurality of inwardly extending protrusions 434 surrounded by a continuous recessed surface 438, together defining a lumen 436 for receiving a hose and engaging the outer layers of the hose within the receiving portion 432. In other exemplary embodiments, the threads, ridges or teeth may be sharp, rounded or flat.

Figure 5:
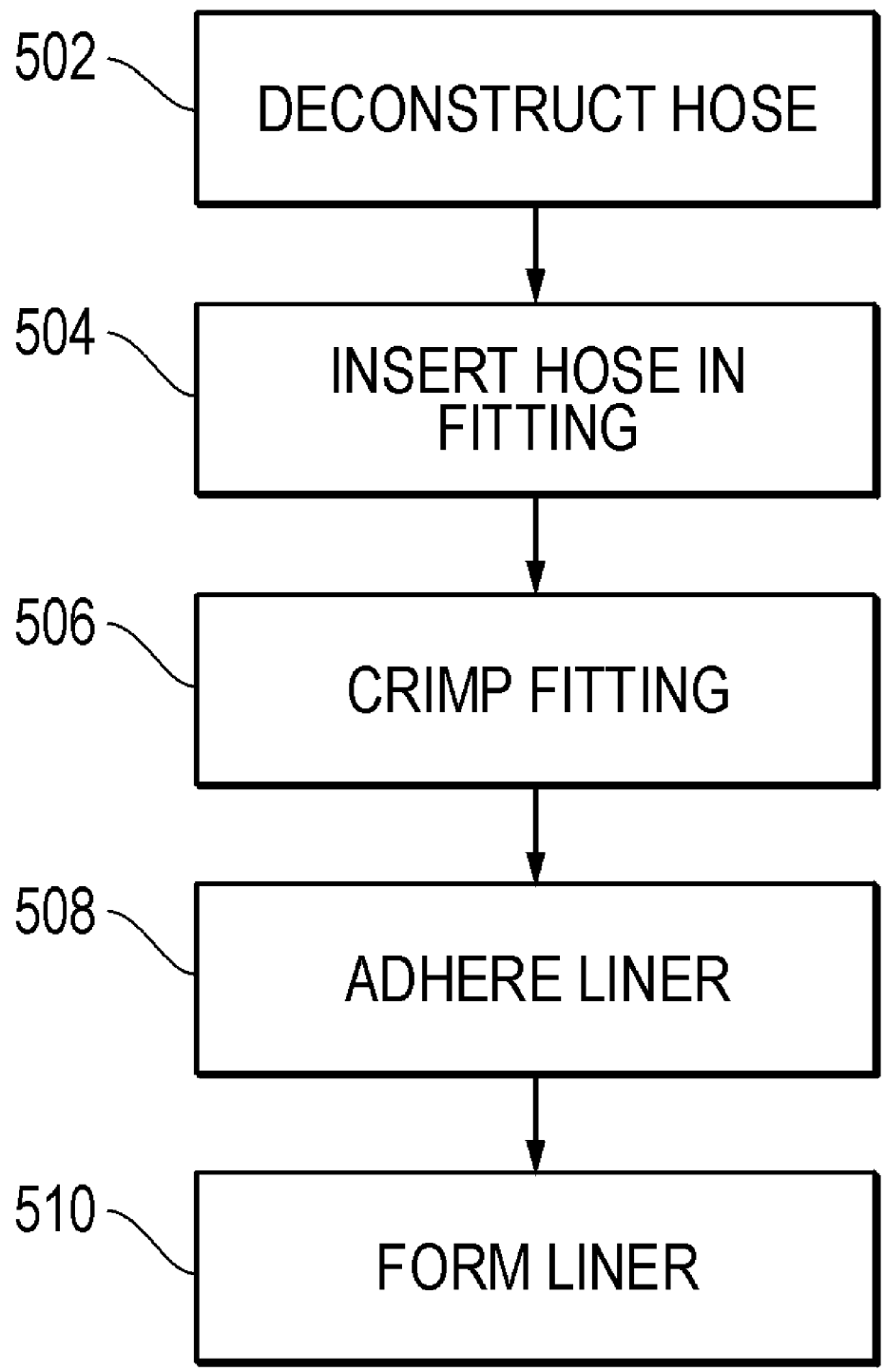
FIG. 5 illustrates an exemplary method for manufacturing an exemplary fluid conduit.

FIG. 5 illustrates an exemplary method for constructing a fluid conduit. A terminal end of the hose may be deconstructed, as shown at step 502. Optionally, the hose may be formed such that an inner layer extends beyond the terminal region of the outer layers.

The hose is inserted into a receiving portion of a fitting, as shown at step 504. The receiving portion of the fitting may include engagement structures, such as radially inwardly extending protrusions for engaging the outer layers of the hose. The inner layer may extend into a coupling portion of the fitting and, in some exemplary embodiments, interact with a surface of the coupling portion. The receiving portion may be crimped to the outer layers of the hose, as shown at step 506. As such, inwardly extending protrusions of the receiving portion of the fitting may engage the outer layers of the hose. Furthermore, the inner layer and the outer layers may remain laminated in this crimped region of the fitting.

As shown at step 508, the inner layer may be adhesively coupled to the inner surface of the coupling portion of the fitting. The inner layer may, for example, be glued, epoxied or otherwise adhered to the inner surface of the coupling portion of the fitting. In addition, the inner layer may be formed to follow the contours of the inner surface and the outer coupling surface or flared at the opening near the coupling surface, as shown at step 510. For example, the inner layer may be thermoformed and flared to the contour of the coupling surface.

In one particular embodiment, the fitting is a one piece fitting which more easily engages the terminal end of the hose. Such exemplary embodiments may reduce fitting costs and costs of manufacture. In a further exemplary embodiment, the hose remains co-laminated in the region of crimping. In this particular embodiment, the hose may exhibit particular performance enhancements at low pressure and high temperature applications.

The above-disclosed subject matter is to be considered illustrative, and not restrictive, and the appended claims are intended to cover all such modifications, enhancements, and other embodiments which fall within the true scope of the present invention. For example, the exemplary fittings may be extended to NPT and compression fitting designs. Thus, to the maximum extent allowed by law, the scope of the present invention is to be determined by the broadest permissible interpretation of the following claims and their equivalents, and shall not be restricted or limited by the foregoing detailed description.

What is claimed is:

1. A fluid conduit comprising:
   a hose including an outer layer and an inner polymeric liner bonded to the outer layer, the inner polymeric liner extending such that fluid traversing through the hose remains only in contact with the inner polymeric liner, the hose having a first portion along which the outer layer is laminated to the inner polymeric liner and along which the inner polymeric liner remains intact, the hose having a second portion along which the inner polymeric liner extends beyond a termination of the outer layer, the first and second portions being contiguous along a longitudinal axis of the hose; and
   a fitting comprising:
   a receiving portion having a first inner surface defining a first lumen portion, the receiving portion configured to receive the first portion of the hose within the first lumen portion, the receiving portion configured for crimping radially inwardly onto an outer surface of the first portion of the hose;
   a coupling portion having a second inner surface defining a second lumen portion for receiving the second portion of the hose, wherein the first lumen portion and the second lumen portion are in fluid communication with each other, the inner polymeric liner of the second portion following the contour of the second inner surface; and
   a shoulder integrally extending from and defining a transition between the receiving portion and the coupling portion.

2. The fluid conduit of claim 1, wherein the inner polymeric liner is adhesively coupled to the second inner surface.

3. The fluid conduit of claim 1, wherein the fitting is a one piece fitting.

4. The fluid conduit of claim 1, wherein the inner polymeric liner of the second portion of the hose comprises a flared portion.

5. The fluid conduit of claim 1, wherein the fitting is a sanitary fitting.

6. The fluid conduit of claim 1, wherein the coupling portion comprises a portion of a flanged coupling.

7. The fluid conduit of claim 1, wherein the first inner surface comprises an engagement structure.

8. The fluid conduit of claim 1, wherein the first lumen portion has a diameter that is greater than the diameter of the second lumen portion.

9. The fluid conduit of claim 1, wherein an inner surface of the shoulder is generally perpendicular to the longitudinal axis of the fitting.

10. The fluid conduit of claim 1, wherein the outer layer terminates about the shoulder.

11. The fluid conduit of claim 1, wherein the fitting is free of an insert extending axially into the first portion of the hose.

12. A fluid conduit comprising:
a hose having an outer layer and an inner polymeric liner, the hose having a first portion in which the outer layer and the inner polymeric liner are laminated and are intact, the hose having a second portion along which the inner polymeric liner extends beyond a termination of the outer layer, the first and second portions being contiguous along a longitudinal axis of the hose; and
a fitting comprising:
a receiving portion having a first inner surface defining a first lumen portion and configured to receive the first portion of the hose, the receiving portion being crimped onto the hose; and
a coupling portion having a second inner surface defining a second lumen portion, the inner polymeric liner of the second portion of the hose extending into the second lumen portion, the inner polymeric liner adhesively coupled to the second inner surface, wherein the first lumen portion and the second lumen portion are in fluid communication with each other.

13. The fluid conduit of claim 12, wherein the coupling portion and the receiving portion are integral with each other.

14. The fluid conduit of claim 12, wherein the inner polymeric liner of the second portion comprises a flared portion.

15. The fluid conduit of claim 12, wherein the fitting further comprises a shoulder integrally extending from and defining a transition between the receiving portion and the coupling portion.

16. The fluid conduit of claim 15, wherein the outer layer terminates about the shoulder.

17. The fluid conduit of claim 12, wherein a diameter of the first lumen is greater than a diameter of the second lumen.

18. The fluid conduit of claim 12, wherein the fitting is free of an insert extending axially into the first portion of the hose.

19. A fluid conduit comprising:
a hose including an outer layer and an inner polymeric liner bonded to the outer layer, the inner polymeric liner extending such that fluid traversing through the fluid conduit remains only in contact with the inner polymeric liner, the outer layer of the hose having a terminal end; and
a one piece fitting comprising a coupling portion and a receiving portion axially opposite the coupling portion, the receiving portion configured to receive the terminal end of the outer layer of the hose, the receiving portion configured for crimping radially inwardly to an outer surface of the outer layer of the hose, the one piece fitting being free of an insert extending axially into the hose.

20. The fluid conduit of claim 19, wherein the hose has a first portion having the inner polymeric liner and the outer layer and a second portion along which the inner polymeric liner extends beyond a termination of the outer layer, the first and second portions being contiguous along a longitudinal axis of the hose, and wherein the inner polymeric liner of the second portion extends into the coupling portion of the one piece fitting and is adhesively coupled to an inner surface of the coupling portion.

21. The fluid conduit of claim 19, wherein the hose has a first portion along which the inner polymeric liner and the outer layer are laminated and remain intact, the hose having a second portion along which the inner polymeric liner extends beyond the outer layer, the first and second portions being contiguous along a longitudinal axis of the hose.

22. The fluid conduit of claim 21, wherein the inner polymeric liner of the second portion of the hose comprises a flared portion.

* * * * *